(12) United States Patent
Dozen et al.

(10) Patent No.: US 9,773,199 B2
(45) Date of Patent: Sep. 26, 2017

(54) IMAGE FORMING APPARATUS AND NON-TRANSITORY COMPUTER-READABLE RECORDING MEDIUM STORING TEST PRINT PAGE INSERTION PROGRAM

(71) Applicant: KYOCERA Document Solutions Inc., Osaka (JP)

(72) Inventors: Kazuki Dozen, Osaka (JP); Makoto Kowaka, Osaka (JP); Yosuke Nakazato, Osaka (JP); Ryusuke Nakatani, Osaka (JP); Takashi Murakami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 29 days.

(21) Appl. No.: 15/159,470

(22) Filed: May 19, 2016

(65) Prior Publication Data
US 2016/0350629 A1 Dec. 1, 2016

(30) Foreign Application Priority Data

May 29, 2015 (JP) .................................. 2015-109645

(51) Int. Cl.
- *G06K 15/02* (2006.01)
- *G06F 3/12* (2006.01)
- *H04N 1/00* (2006.01)

(52) U.S. Cl.
CPC ....... *G06K 15/1807* (2013.01); *G06F 3/1208* (2013.01); *G06F 3/1256* (2013.01); *G06F 3/1285* (2013.01); *H04N 1/0032* (2013.01); *H04N 1/00411* (2013.01); *H04N 2201/0081* (2013.01); *H04N 2201/0094* (2013.01)

(58) Field of Classification Search
CPC . G06K 15/1807; G06F 3/1208; G06F 3/1256; G06F 3/1286; G06F 3/1243; H04N 1/00411; H04N 1/0032; H04N 2201/0094; H04N 2201/0081
USPC .............................. 358/1.15, 1.18, 406, 504
See application file for complete search history.

(56) References Cited

U.S. PATENT DOCUMENTS

| | | | | |
|---|---|---|---|---|
| 2006/0238811 A1* | 10/2006 | Soma | ..................... | G03G 15/55 358/1.16 |
| 2011/0267650 A1* | 11/2011 | Morita | .................... | G06F 3/121 358/1.15 |
| 2014/0333944 A1* | 11/2014 | Ueda | ..................... | G03G 15/00 358/1.12 |

FOREIGN PATENT DOCUMENTS

| | | |
|---|---|---|
| JP | 2000-112308 A | 4/2000 |
| JP | 2007-208780 A | 8/2007 |

* cited by examiner

*Primary Examiner* — Kent Yip
(74) *Attorney, Agent, or Firm* — Stein IP, LLC

(57) ABSTRACT

An image forming apparatus is provided which can insert a test-printed sheet on an arbitrary page into an intended page. The image forming apparatus includes a test print selection portion, an original document reading portion, a test print page specification portion, a test print portion, a sheet set member, a print instruction portion and a print portion, where from image data on the read original document, overall page information, information specifying the page on which the test print is performed and detection information indicating that the test print page is set in the sheet set member, based on the instruction from the print instruction portion, the print portion performs the print while inserting the test print page into the intended page.

8 Claims, 3 Drawing Sheets

IMAGE FORMING APPARATUS AND NON-TRANSITORY COMPUTER-READABLE RECORDING MEDIUM STORING TEST PRINT PAGE INSERTION PROGRAM

INCORPORATION BY REFERENCE

This application is based upon and claims the benefit of priority from the corresponding Japanese Patent Application No. 2015-109645 filed on May 29, 2015, the entire contents of which are incorporated herein by reference.

BACKGROUND

The present disclosure relates to an image forming apparatus such as a copying machine, a printer, a facsimile machine or a multifunctional machine that forms an image on a sheet, and more particularly relates to an image forming apparatus that performs insertion print and a non-transitory computer-readable recording medium that stores a test print page insertion program.

As a document management apparatus, there is a typical image forming apparatus that can perform insertion print without individually specifying insertion data.

In the typical image forming apparatus, the second row from the top of a template is specified as an insertion position, and the first row on the first page of the first original document set is specified as an insertion data position, and thus the insertion data is entered into the insertion position on the template, with the result that a front cover for the first original document set is produced. The number of sheets in the first original document set is specified, thus the first page of the second original document set is detected, the first row thereof is regarded as the insertion data position and the insertion data is entered into the insertion position on the template, with the result that a front cover for the second original document set is produced.

However, in the typical image forming apparatus, it is possible to perform insertion into the front cover but it is impossible to insert a sheet into part other than the front cover.

There is another typical image forming apparatus in which a user can perform test print and when the user is not satisfied with a test-printed image, the image on an image formation medium such as plain paper is erased and thus it is possible to recycle the image formation medium.

There is another typical image forming apparatus in which between a transfer drum and a transfer roller and a fixing unit, an unfixed output transport path is coupled to a normal output transport path, and thus switching can be performed. For the erasing of an unfixed image, an erasing drum, an erasing roller, a cleaning brush, a toner charging device and the like are included. When an output image does not satisfy the requirements of a user, an unfixed toner on an image formation medium is charged with the toner charging device and is passed between the erasing drum and the erasing roller to produce a potential difference therebetween, this potential difference is utilized to move the toner to the erasing drum and the toner is removed with the cleaning brush.

Hence, an image forming apparatus using an electrophotographic system is made to have a function capable of selecting whether or not a toner image is fixed, and furthermore, the image forming apparatus is made to have a function of erasing an image when an unfixed output is produced, with the result that it is possible to recycle an image formation medium.

SUMMARY

According to a first aspect of the present disclosure, there is provided an image forming apparatus including a test print selection circuit, an original document reading circuit, a test print page specification circuit, a test print circuit, a sheet set member, a print instruction circuit, a print circuit and a print control circuit. The test print selection circuit allows whether or not test print is performed to be selected such that a test-printed sheet on an arbitrary page itself can be inserted into an intended page. The original document reading circuit reads an original document based on the selecting of the test print. The test print page specification circuit specifies a page on which the read original document is test-printed. The test print circuit allows the page specified on the test print to be test-printed. The sheet set member sets a test print page that is printed and output by the test print. The print instruction circuit instructs the read original document to be printed. The print circuit prints the read original document by the instruction of the print. The print control circuit controls the print circuit, from information on the read original document, information specifying the page on which the test print is performed and information indicating that the test print page is set, based on the instruction from the print instruction circuit, and allows the print to be performed while the test print page in the sheet set member is inserted into the intended page.

The present disclosure may be a method of inserting the test print page with the image forming apparatus having the configuration described above.

DETAILED DESCRIPTION

In order to allow a test-printed sheet on an arbitrary page itself to be inserted into an intended page, a print control portion is included that controls a control portion, from information on a read original document, information specifying the page on which the test print is performed and information indicating that the test print page is set, based on an instruction from a print instruction portion and that allows print to be performed while inserting the test print page on a set portion into the intended page, with the result that its objective is realized.

Embodiment

[Image Forming Apparatus]

Figure 1:
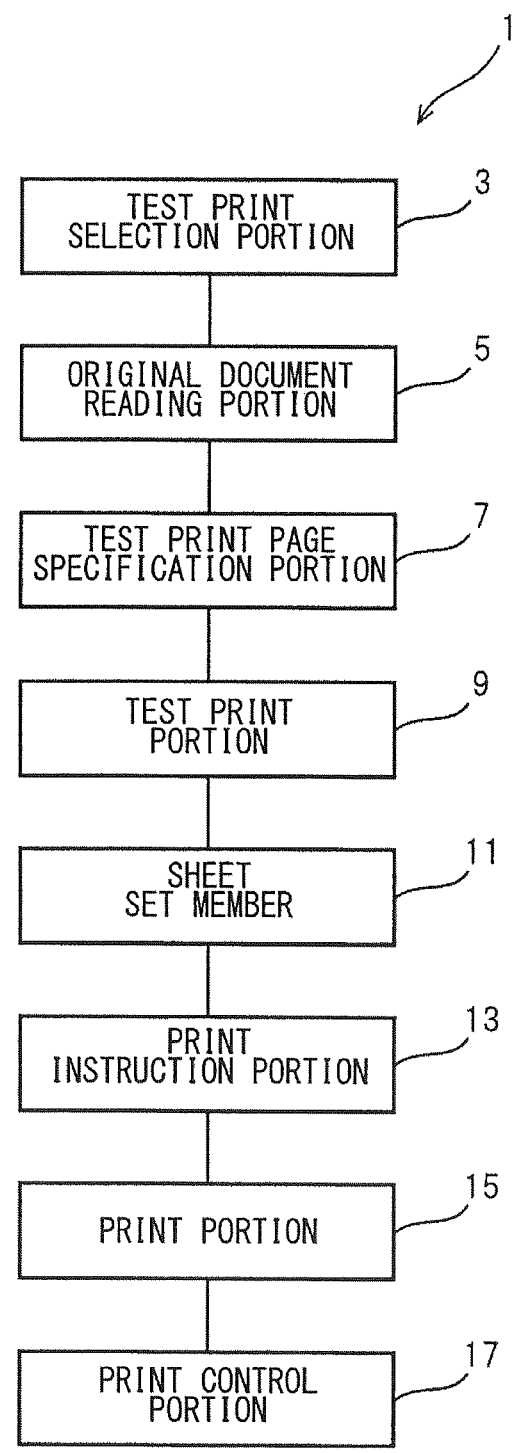
FIG. 1 shows the main configuration of an image forming apparatus (first embodiment)
Figure 2:
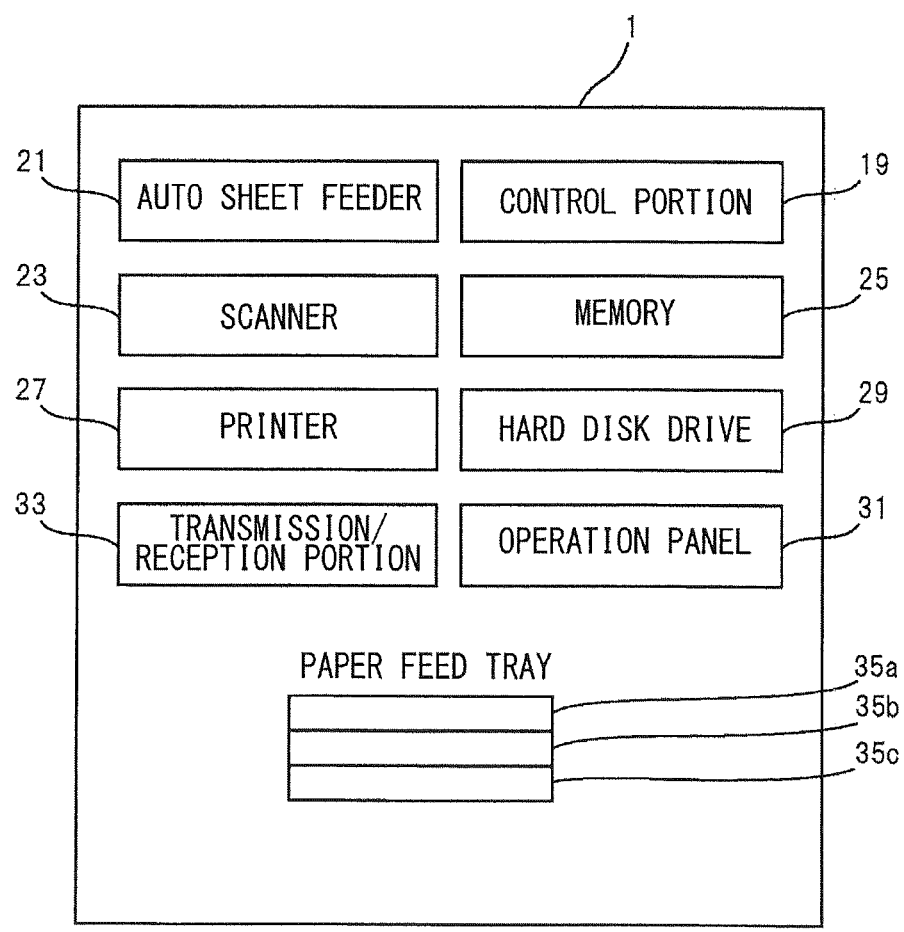
FIG. 2 shows the overall configuration of the image forming apparatus (first embodiment)

FIG. 1 shows the main configuration of an image forming apparatus, and FIG. 2 shows the overall configuration of the image forming apparatus.

As shown in FIG. 1, the image forming apparatus 1 includes a test print selection portion 3, an original document reading portion 5, a test print page specification portion 7, a test print portion 9, a sheet set member 11, a print instruction portion 13, a print portion 15 and a print control portion 17. The test print selection portion 3, the original document reading portion 5, the test print page specification portion 7, the test print portion 9, the print instruction portion 13, the print portion 15 and the print control portion 17 include a processor such as a Central Processing Unit (CPU) which has one or a plurality of circuits. Here, the circuit can be formed with an electronic component or an electronic substrate in which a plurality of electronic elements are connected by wiring. The circuit can read and execute various types of programs or can execute various types of programs that are previously incorporated therewithin.

The test print selection portion 3 allows whether or not test print is performed to be selected, and for example, with a touch panel-type operation panel in a multifunctional machine that will be described later, a touch operation is performed on an intended portion to input the selection.

The original document reading portion 5 reads the original document based on the selection of the test print, and is formed with, for example, a scanner in the multifunctional machine that will be described later.

The test print page specification portion 7 specifies the page on which the read original document is test-printed, and is formed with, for example, the operation panel in the multifunctional machine that will be described later. The test print page specification portion 7 specifies the page by, for example, the touch operation on the touch panel. The specification of the page described above allows an arbitrary page to be specified.

The test print portion 9 allows the page specified on the test print to be test-printed, and is formed with, for example, a printer in the multifunctional machine that will be described later.

The sheet set member 11 is set for inserting, into an intended page, the test print page that is printed and output by the test print, and is formed with, for example, paper feed trays in the multifunctional machine that will be described later.

The print instruction portion 13 instructs, for example, all the pages of the read original document to be printed, and provides the instruction to print all the pages by, for example, the touch operation on the touch panel in the multifunctional machine that will be described later. The print instruction portion 13 can also instruct necessary pages of the read original document to be printed.

The print portion 15 prints the read original document by the instruction of the print, and in the present embodiment, as with the test print portion 9, is formed with, for example, the printer in the multifunctional machine that will be described later.

The print control portion 17 controls the print portion 15, from information on the read original document, information specifying the page on which the test print is performed and information indicating that the test print page is set, based on the instruction from the print instruction portion 13 and allows the print to be performed while inserting the test print page on the set member into the intended page, and is formed, for example, a control portion in the multifunctional machine that will be described later.

As shown in FIG. 2, the image forming apparatus 1 is formed with, for example, the multifunctional machine, and includes the control portion 19 that includes a configuration in which a memory is coupled to a processor, and the processor further includes, through an interface, an auto sheet feeder 21, the scanner 23, a memory 25, the printer 27, a hard disk drive 29, the operation panel 31, a transmission/reception portion 33 and the paper feed trays 35a, 35b and 35c.

The control portion 19 controls individual portions and individual types of processing, and functions as the print control portion 17.

The auto sheet feeder 21 feeds the original document in order to read the original document, and the image of the original document fed by the auto sheet feeder 21 is read by the scanner 23 that operates as the original document reading portion 5, is stored in the memory 25 and is processed.

The printer 27 includes a paper feed portion, an image formation portion, a fixing device and a sheet transport portion, operates as the print portion 15 and also operates as the test print portion 9. The image formation portion forms, based on image data processed by the control portion 19, a toner image on a photosensitive drum and transfers the toner image to a sheet feed from the paper feed portion, for example, any one of the paper feed trays 35a, 35b and 35c. The fixing device fixes the toner image onto the sheet. The sheet transport portion transports the sheet from the paper feed trays 35a, 35b and 35c to the image formation portion, then transports the sheet to the fixing device and further ejects the sheet.

The paper feed tray 35a also operates as the sheet set member 11, and the test print page printed and output by the test print is set for insertion. While a test print mode is selected, when the sheet is set, the setting of the sheet is detected and a detection signal is input to the control portion 19.

In the hard disk of the hard disk drive 29, an OS, application programs and data are stored.

The operation panel 31 is, for example, a touch panel, makes a user perform various types of settings and is also used for displaying information. The operation panel 31 also operates as the test print selection portion 3, the test print specification portion 7 and the print instruction portion 13.

In order to perform a print job, the transmission/reception portion 33 is coupled through a network interface to an external computer by a LAN, and allows image information and the like to be transmitted and received.

[Insertion Print Processing]

Figure 3:
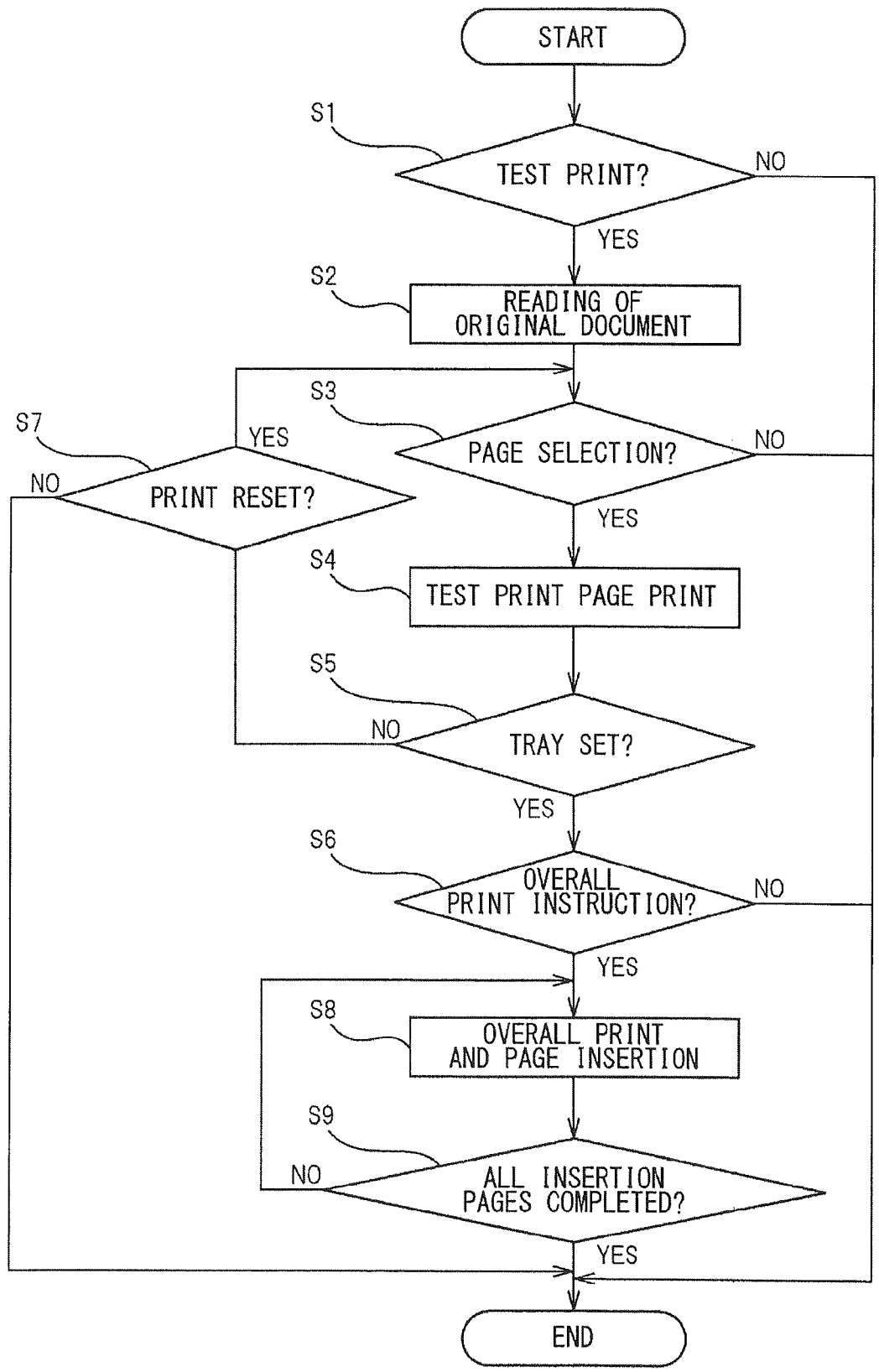
FIG. 3 shows steps for insertion print processing (first embodiment).

FIG. 3 shows steps for insertion print processing.

In step S1 (hereinafter, step S is referred to as "S" in short), a determination of "test print?" is performed, and thus when on the operation panel 31, a test print key is touched, the process is transferred to S2 whereas when it is not touched, the process is completed, and a normal print state is retained.

In S2, in the "reading of the original document", the auto sheet feeder 21 and the scanner 23 are driven, the images of the original document that are sequentially fed by the auto sheet feeder 21 are read by the scanner 23, the image data thereof is stored in the memory 25 together with overall page information and the process is transferred to S3. The image data and the overall page information are used for insertion print and insertion print image formation that will be described later.

In S3, a determination of "page selection?" is performed, and thus when the test print page is specified (yes), the process is transferred to S4 whereas when the page is not specified (no), the processing is completed after a set time has elapsed, and the process is returned to normal print.

The specification of the test print page is performed on a screen displayed on the operation panel 31 after the reading of the original document. On the operation panel 31, the screen for specifying the test print page is displayed, and the user specifies the test print page on this screen. The specified page is stored in the memory 25 as information specifying the page on which the test print is performed and is used for insertion print that will be described later.

In S4, in the "print of the test print page", the printer 27 operates as the test print portion 9, and when a start button is operated, an instruction is provided from the control portion 19 to form only an image on the specified test print page in the image formation portion, a print output is performed by paper feed from any one of the paper feed trays 35a, 35b and 35c and the process is transferred to S5.

When the user sees the output test print page and is satisfied with it, the user sets it on the paper feed tray 35a for insertion print. Whether or not the user sees the test print page and is satisfied with it depends, for example, whether or not the fine image of the original document satisfies the requirements of the user for the results of the print or whether or not print settings such as a density setting made by the user satisfies the requirements of the user for the results of the print. The paper feed tray for insertion print can be arbitrarily set on, for example, the operation panel 31, and the set information is stored in the memory 25 and is used for insertion print that will be described later. The paper feed tray for insertion print can be fixed to any one of the paper feed trays 35a, 35b and 35c.

In S5, a determination of "set in tray?" is performed, and thus when the test print page is set in the paper feed tray 35a for insertion print (yes), the process is transferred to S6 whereas when it is not set therein (no), the process is transferred to S7.

Whether or not the test print page is set in the paper feed tray 35a for insertion print is based on the detection, by a sensor, that a sheet is set in the paper feed tray 35a when the setting of the test print is performed. This detection signal is input to the control portion 19 and is used for insertion print. With consideration given to the fact that the paper feed tray for insertion print can be arbitrarily set, the sensor for detecting that the sheet is set is provided in each of the paper feed trays 35a, 35b and 35c.

In S6, a determination of "overall print instruction?" is performed, and thus when after the test print page is set in the paper feed tray 35a, the user instructs, on the operation panel 31, the overall print of the original document to be performed (yes), the process is transferred to S8 whereas when no instruction is provided, the processing is completed after a set time has elapsed, and the process is returned to the normal print.

In S7, a determination of "print reset?" is performed, and thus when after the confirmation of the test print page, the user resets the density of the print or the like (yes), the process is returned to S3 whereas when the resetting is not performed (no), the process is completed after a set time has elapsed. When the process is returned to S3, after a determination of "page selection?" is performed again, the process is transferred to S4, and only the test print page that is specified again is printed and output.

In S8, in "overall print and page insertion", by an instruction from the control portion 19, the image formation portion of the printer 27 performs image formation for overall print from page information on the test print page stored in the memory 25, image data on the read original document and overall page information. In this image formation, an image is formed except the page corresponding to the test print page. Based on the formed image, the control portion 19 controls the printer 27 and makes the printer 27 perform the print while inserting the test print page set in the paper feed tray 35a into the intended page, and the process is transferred to S9. In other words, the control portion 19 controls the printer 27 and makes the printer 27 perform the print while inserting the test print page such that the page of the formed image is continuous to the test print page.

In the print, the control portion 19 controls the sheet transport portion of the printer 27 such that the pages other than the test print page are fed from any one of the paper feed trays 35b and 35c, and when the page corresponding to the test print page is fed, the test print page is transported from the paper feed tray 35a. When the test print page is inserted, the process is transferred to S9 even if the print is performed in the middle of all the pages.

In S9, a determination of "all insertion pages completed?" is performed, and thus when the insertion of all the test print pages is completed (yes), the process is completed whereas when a test print page is left (no), the process is returned to S8.

In S8, when the insertion print is continued, and the page corresponding to the subsequent test print page is transported, the subsequent test print page is transported from the paper feed tray 35a, and the print is continued while the test print page is inserted into the intended page.

When the test print page is not the final page, the insertion of all the test print pages is completed and the process is completed through S9, all the remaining pages are printed and output by transfer to the normal print.

When the test print page is the final page, and the process is completed through S9, the print operation of the printer 27 is completed. The insertion of the test print page can be brought into a form in which only one sheet is inserted into an arbitrary page.

Effects of Embodiment

In the present embodiment, from the image data on the read original document, the overall page information, the information specifying the page on which the test print is performed and the detection information on the setting of the test print page in the paper feed tray 35a, based on an instruction of the overall print on the operation panel 31, the printer 27 can perform the overall print while the test print page in the paper feed tray 35a is inserted into the intended page.

Hence, a test-printed sheet on an arbitrary page itself can be inserted into the intended page without the test print page being wasted.

[Others]

Although in the present embodiment, the case where the present disclosure is applied to copying is described, the present disclosure can also be applied to a print job.

In the present disclosure, a test-printed sheet on an arbitrary page itself can be inserted into the intended page.

What is claimed is:

1. An image forming apparatus comprising:
   a test print selection circuit that allows whether or not test print is performed to be selected;
   an original document reading circuit that reads an original document based on the selection of the test print;
   a test print page specification circuit that specifies a page on which the read original document is test-printed;
   a test print circuit that allows the page specified on the test print to be test-printed;
   a first paper feed tray that sets, for insertion, a test print page that has been printed and output by the test print;
   a second paper feed tray that sets a sheet on which a page other than the test print page is printed;

a print instruction circuit that instructs the read original document to be printed;

a print circuit that prints the read original document by the instruction of the print; and a print control circuit that, after the test print, controls the print circuit, from information on the read original document, information specifying the page on which the test print is performed during the test print and information indicating that the test print page is set, based on the instruction from the print instruction circuit, and that allows the print of the entire read original document to be performed while the test print page in the first paper feed tray is inserted into an intended page, wherein the print control circuit controls the print circuit such that
the sheet is fed from the second paper feed tray when the page other than the test print page occurs, and
the test print page is fed from the first paper feed tray each time a page corresponding to the test print page occurs.

2. The image forming apparatus according to claim 1, wherein the test print circuit—prints an image of the test print page when performing the test print, and the print circuit—prints an image of the page other than the test print page when performing the print while inserting the test print page.

3. The image forming apparatus according to claim 1, wherein the test print page specification circuit can specify a plurality of pages on which the test print is performed, and the print control circuit feeds the test print page from the first paper feed tray each time a page corresponding to the test print page occurs.

4. The image forming apparatus according to claim 1, wherein the test print circuit—prints an image of the test print page when performing the test print and the print circuit—prints an image of the page other than the test print page when performing the print while inserting the test print page, the test print page specification circuit can specify a plurality of pages on which the test print is performed, and the print control circuit feeds the test print page from the first paper feed tray each time a page corresponding to the test print page occurs.

5. A non-transitory computer-readable recording medium that stores a test print page insertion program executable by a computer in an image forming apparatus including a sheet set member, the sheet set member having a sheet set member first paper feed tray that sets, for insertion, a test print page that has been printed and output by the test print and a second paper feed tray that sets a sheet on which a page other than the test print page is printed, the page insertion program making the computer operate as:

a test print selection circuit that allows whether or not test print is performed to be selected;

an original document reading circuit that reads an original document based on the selection of the test print;

a test print page specification circuit that specifies a page on which the read original document is test-printed;

a test print circuit that allows the page specified on the test print to be test-printed;

a print instruction circuit that instructs the read original document to be printed;

a print circuit that prints the read original document by the instruction of the print; and a print control circuit that, after the test print, controls the print circuit, from information on the read original document, information specifying the page on which the test print is performed during the test print and information indicating that the test print page is set, based on the instruction from the print instruction circuit, and that allows the print of the entire read original document to be performed while the test print page in the first paper feed tray is inserted into an intended page, wherein the print control circuit controls the print circuit such that
the sheet is fed from the second paper feed tray when the page other than the test print page occurs, and
the test print page is fed from the first paper feed tray every time a page corresponding to the test print page occurs.

6. The recording medium according to claim 5, wherein the test print circuit—prints an image of the test print page when performing the test print and the print circuit—prints an image of the page other than the test print page when performing the print while inserting the test print page.

7. The recording medium according to claim 5, wherein the test print page specification circuit can specify a plurality of pages on which the test print is performed, and the print control circuit feeds the test print page from the first paper feed tray every time a page corresponding to the test print page occurs.

8. The recording medium according to claim 5, wherein the test print circuit—prints an image of the test print page when performing the test print and the print circuit—prints an image of the page other than the test print page when performing the print while inserting the test print page, the test print page specification circuit can specify a plurality of pages on which the test print is performed, and the print control circuit feeds the test print page from the first paper feed tray each time a page corresponding to the test print page occurs.

* * * * *